UNITED STATES PATENT OFFICE.

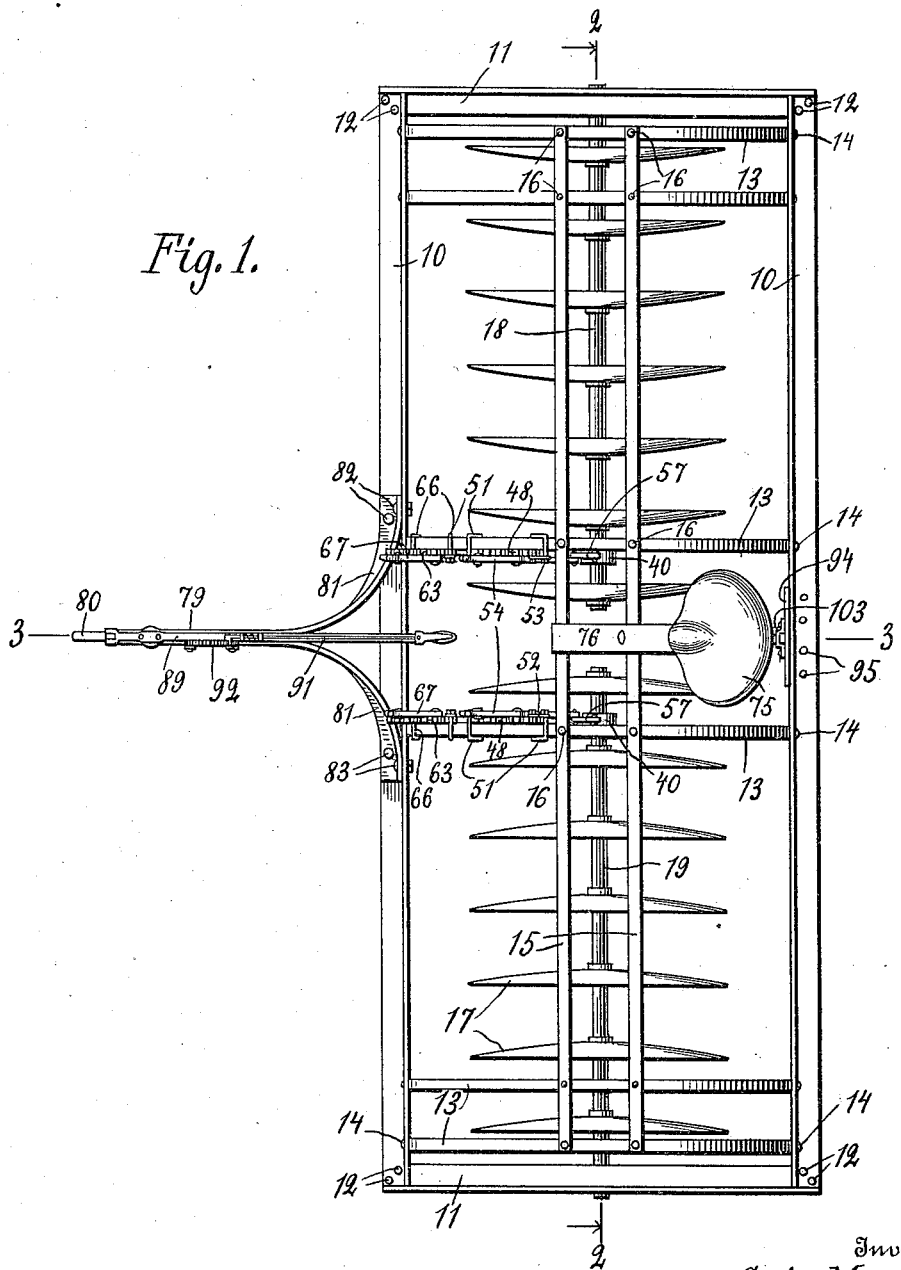

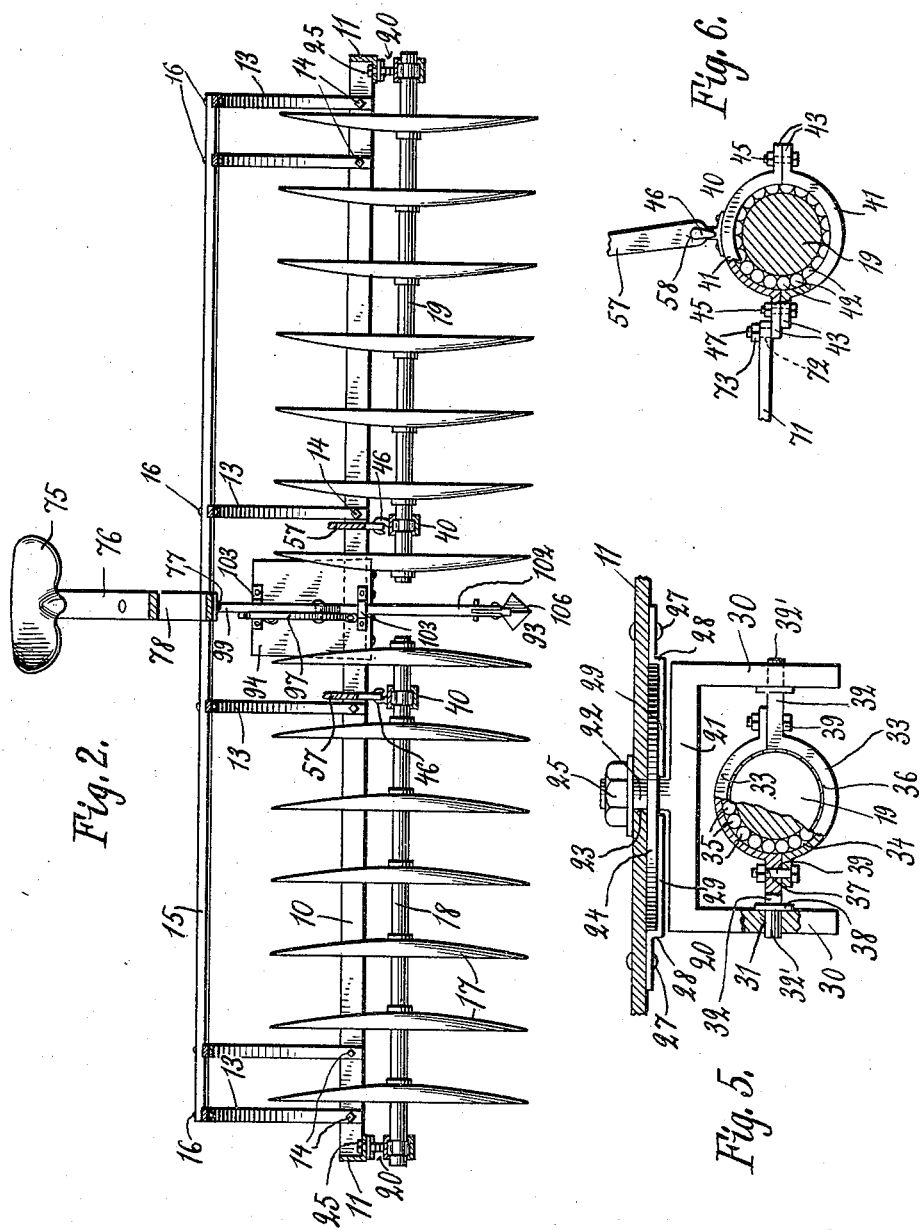

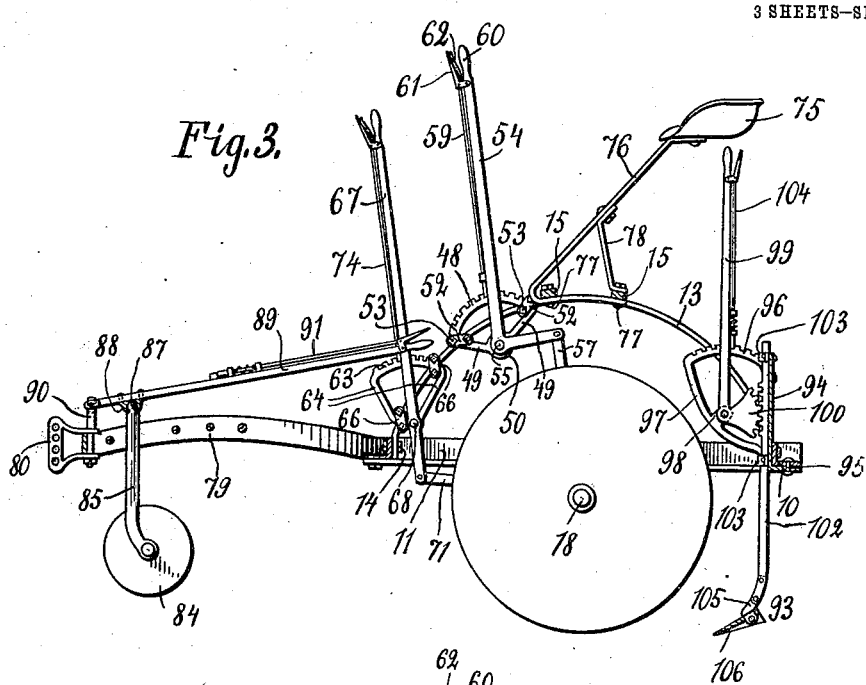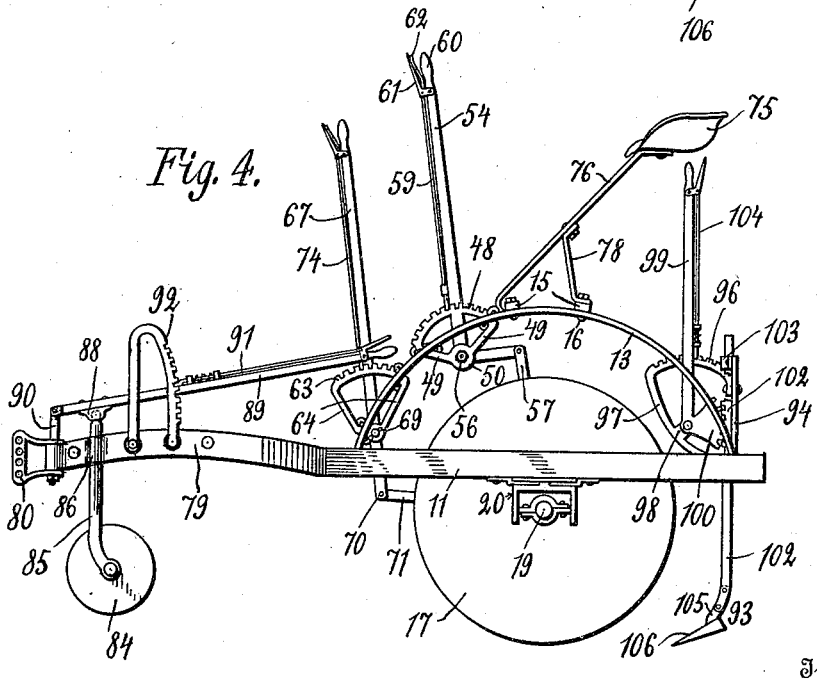

CHARLES A. MONROE AND WILLIE E. ROBINSON, OF LOWER LAKE, CALIFORNIA.

HARROW.

1,006,972. Specification of Letters Patent. Patented Oct. 24, 1911.

Application filed August 19, 1910. Serial No. 578,009.

*To all whom it may concern:*

Be it known that we, CHARLES A. MONROE and WILLIE E. ROBINSON, citizens of the United States, residing at Lower Lake, in the county of Lake, State of California, have invented certain new and useful Improvements in Harrows; and we do hereby declare the following to be a full, clear, and exact description of the invention, such as will enable others skilled in the art to which it appertains to make and use the same.

This invention relates to disk harrows and has for its principal object to provide a harrow that will more effectively level uneven ground than usual by virtue of having a pair of independently controlled disk shafts, the opposed ends of these shafts being capable of movement vertically and horizontally in order to enable the disks to be set at any desired angular position relatively to the longitudinal axis of the harrow to attain the above end.

A further object is to provide a simple, strong and durable harrow that will have a novel tongue which carries an adjustable caster.

With the above objects in view, the invention consists of the novel details of construction and combination of parts hereinafter fully described and claimed, it being understood that various modifications may be made in the minor details of construction within the scope of the appended claims.

In the accompanying drawings forming part of this specification: Figure 1 is a plan view of a harrow constructed in accordance with our invention. Fig. 2 is a longitudinal sectional view taken on the line 2—2, Fig. 1. Fig. 3 is a transverse sectional view taken on the line 3—3, Fig. 1. Fig. 4 is an end elevation of the harrow. Fig. 5 is an enlarged side elevation of one of the outer shaft boxes, with portions broken away to expose the roller bearings. Fig. 6 is an enlarged side elevation of one of the inner shaft boxes with portions broken away to expose the roller bearings.

Referring now to the drawings, the harrow frame is shown to be rectangular in contour and formed from an angle iron strip of metal. The longitudinal sides 10 and ends 11 are connected together at their meetings by rivets or similar connectors 12. A plurality of arched flat rods 13 have their opposite ends bolted or otherwise rigidly secured to the longitudinal sides of the frame as shown at 14. These rods are preferably arranged in pairs, a pair being arranged adjacent each end bar of the frame and a pair being arranged at approximately the center of the frame, this latter pair serving as a support for the shaft adjusting levers hereinafter described. A pair of flat bars 15 are supported upon the top faces of the rods 13, one of these bars being placed upon either side of the longitudinal axis of the frame, and bolted or otherwise rigidly secured to the arched rods as shown at 16. This frame just described forms a rigid and open housing above the colters or harrow disks 17.

The harrow disks are arranged in sets, each set being fixed upon an independent shaft one end of which is held by a knuckle to one end bar of the harrow frame and the opposite end of which is suspended for vertical and horizontal movement, thus presenting independently movable sets of disks. The number of shafts in this instance is shown to be two designated by the numerals 18 and 19, these shafts being alined and having their outer ends secured to the end bars of the harrow frame.

For securing the outer ends of the shafts to the end bars of the harrow frame, knuckles 20 are provided, and since these knuckles are identical in construction, but one will be now described. A metal yoke 21 is provided at the central portion of its shoulder with a stem 22 which projects through a suitable opening 23 formed in the end bar of the harrow frame. This stem is provided upon its intermediate portion with a washer like collar 24 which is adapted to bear upon the bottom face of the harrow frame end bar, the stem being further equipped at its extremity with a retaining nut 25 which is spaced from the top face of the frame end bar by a washer 26. Bolted to the bottom face of the end bar as shown at 27 is a pair of keepers, each keeper having its intermediate portion bent at right angles and extending parallel with the outer edge of the collar 24 as shown at 28, and being thence bent to extend over and engage the bottom face of the collar as shown at 29, these latter named bent portions of the keeper being adapted to form a bearing which coöperates with the bottom face of the end bar to retain the yoke in place without relying upon the nut 25 to accomplish this end. These keepers prevent lateral or rocking movement of the yoke and permit of the yoke swiveling to any desired degree. The branches 30 of the yoke are provided adjacent their middle portions with alined circular openings 31 for the reception of the shaft boxes. Each shaft box is formed in two sections, each section comprising a substantially square solid shank 32 having one end provided with a tubular gudgeon 32', the intermediate portion of the shank being arched outwardly to form a semicircular roller housing 33, this housing being provided upon its inner periphery with a recess 34 in which is loosely mounted rollers 35, the periphery of these rollers extending beyond the edges 36 of the roller housing as shown. The shank of each section is provided adjacent the ends of the roller housing with bolt openings 37 and is further provided adjacent one end with a stop shoulder 38.

In assembling the sections, the gudgeons of the sections are inserted in the circular openings in the yoke branches until the stop shoulders are in abutting contact with the opposed faces of the branches and when in this position the bolt openings of each shank section will have come into registration, when bolts 39 may be passed through the registering openings to rigidly secure the sections together, it being understood that when in this position the disk shaft is disposed with its periphery engaging the peripheries of the rollers. It will be here noted that the yoke is capable of swiveling upon the end bar of the harrow frame and that the sectional axle box is capable of rotating in the yoke, this construction permitting of the free end of the shaft carried within this knuckle to move vertically or horizontally in order to dispose the harrow disks in any angular position relatively to the longitudinal axis of the harrow frame.

For securing the opposed ends of the shafts 18 and 19 in any desired position, a pair of boxes 40 are suspended from the arched rods of the frame, and since each of these boxes is identical in construction, but one will be now described. The box is formed from two sections each section comprising an arcuate channel bar 41 between the lateral flanges of which are housed a plurality of rollers 42, the extreme ends of the back plate of each of the channel bars being provided with laterally extending plate like lugs 43 through which bolt openings 44 are passed. In assembling the sections, bolts 45 are passed through the registering bolt openings of the abutting lugs of the sections and rigidly secure the sections together. The peripheries of the rollers 42 project beyond the inner periphery of the lateral flanges and engage the periphery of the shaft. Fixed at one end upon the uppermost section of the box is a hook 46 and fixed upon the outer extremity of the forward lug of the upper section is a post 47, this hook and post forming means for suspending the box from the harrow frame as will now be described.

Mounted upon the centrally located arched rods are a pair of notched segments 48, one segment being arranged above each box 40. Each segment is provided at its opposite ends with a pair of radial bars 49 which meet at the center of curvature of the segment and merge at their meeting into a tubular bearing 50. The notched segment may be secured to the arched rods in any preferred manner, one expedient method being to engage a pair of clevises 51 over the outer corners of the notched segment and coinciding portions of the arched rod, the flat cross bar 52 which connects the threaded terminals of each clevis being advanced by the retaining nuts 53 of the clevis so as to tightly crimp the sagment and arched rod together. An L shaped actuating lever 54 is provided at its elbow with a laterally extending gudgeon 55 which is disposed in the bearing 50 of the notched segment and is provided at its extremity with a retaining nut 56 which prevents its accidental withdrawal. The short leg of this bell crank lever is pivotally connected to one end of a connecting link 57, the opposite end of this link being provided with an eye 58 which engages the before mentioned hook 46. It is now evident that when the lever is rocked forwardly that through the instrumentality of the link and hook, the shaft box 40 will be moved vertically upward, and when the lever is rocked rearwardly, it will be moved vertically downward. For holding the shaft at any particular position within the limits of its vertical movement a latch rod 59 is pivoted adjacent its upper end to the grip 60 of the lever 54 and engages the notches of the notched segment with its free end. The extreme upper end of the latch rod is offset outwardly as shown at 61 and a leaf spring 62 holds this offset extremity spaced from the grip 60 of the operating lever. By compressing the offset portion 61 of the latch the free end of the latch may be lifted from engagement with the segment so that the lever may be rocked to any desired position and when the latch is released the free end of the latch again engages the segment and locks the lever and thereby the shaft at its particular position desired by the operator.

For moving the free ends of the shafts horizontally, a pair of notched segments 63 is mounted upon the arched rods adjacent their junctures with the leading longitudinal side bar of the harrow frame. Each segment is similar to the segments above described, that is, has extending from its extremities a pair of radial bars 64 which merge at their meeting into a tubular bearing 65, these segments being secured to the arched rods by means of clevises 66 as shown. Arranged in the tubular bearing of each notched segment is a straight lever 67 having a laterally extending gudgeon 68 intermediate its ends engaged in the segment bearing and provided with a cotter pin 69 which prevents its accidental withdrawal. The lower end of the lever is provided with an eye 70 which engages the hooked extremity of a link 71, the latter terminating at its free end in an eye 72 which is swivelly mounted upon the before mentioned post 47, the latter being equipped with a cotter pin 73 which prevents the displacement of the connecting link. It is now evident that by rocking forwardly the lever that the free end of the shaft is moved horizontally rearward and by rocking rearward the lever the free end of the shaft is rocked horizontally forward. For locking the lever in any desired position, a spring pressed latch 74 is mounted upon the lever, this latch being similar to the latch above described in detail.

From the above description, it will be seen that the operator who sits on a seat secured upon the longitudinal bars 19 as will hereinafter be described, is in convenient reach of all four of the levers which move the free ends of the shafts and may move all of the levers or any particular set of levers which will affect the desired adjustment of the shafts. The operator's seat comprises a saddle 75 supported upon an inclined saddle post 76, the lower end of this saddle post being bent to engage the bottom faces of the bars and being bolted or otherwise rigidly secured to the bars as shown at 77. An inclined brace 78 is secured at one end to the lower face of the saddle post and at its opposite end to the top face of the rearmost bar 15.

The draft tongue 79 employed in connection with the harrow frame consists of a straight short bar of metal, one extremity of this bar being equipped with an apertured draft iron 80 and the opposite extremity being split and the branches directed laterally as shown at 81, each branch being bent longitudinally upon itself and the legs of this bent portion bolted as shown at 82 and 83 to the legs of the leading side bars of the frame, the bent portion of each of the branches 81 snugly fitting in the elbow of the angle iron side bar as shown.

A caster 84 is mounted upon the tongue, this caster having a hanger 85 which works in a bearing box 86 adjacent the free end of the tongue and projects considerably above the tongue. The upper end of the hanger terminates in a swivel head 87 which is inclosed by a socket 88, the latter being secured to the intermediate portion of a lever 89 for lowering or raising the caster. The lever is fulcrumed at its free end on a standard 90 and is provided with a spring latch 91 which engages a notched segment 92 of the preferred form shown.

Mounted upon the rear longitudinal bar of the harrow frame is a center cut 93. The center cut support comprises a plate 94, the lower edge of which is turned outwardly at right angles to the main body of the plate and bears upon the bottom face of said bar and is rigidly secured thereto by bolts, rivets or similar connectors 95. Bolted to the plate 94 is a metal rack 96, the free end of this rack being connected to the plate 94 by an arcuate strip 97, the free end of this strip being bolted to the plate as shown. Rising obliquely from the strip 97 is a standard 98 to which is pivotally secured a lever 99, this lever having a gudgeon which extends through a suitable opening in the standard and is equipped at its extremity with a rack segment 100. The rack 100 meshes with the rack formed on the shank 102 of the center cut, the latter being secured to the plate 94 by means of guide straps 103 which permit of the center cut shank sliding upward or downward when the lever is rocked. A spring latch 104 is mounted upon the lever and engages the notched segment 96 whereby to enable the center cut to be locked in any desired position. The free end of the center cut shank is provided with an arcuate link 105 which terminates in a V shaped extremity, this V shaped extremity serving to fit in a like shaped opening formed in a plow share 106 and removably secure the latter in position.

What is claimed is:—

1. A harrow including a frame, arched brace rods carried by said frame, a pair of shafts mounted on said frame, and having knuckle connections between their outer ends and said frame, boxes secured to the inner ends of said shaft, a pair of levers pivoted on said arched rods, links loosely connected to said levers and to said boxes for moving the inner ends of the shafts horizontally, a pair of bell crank levers pivoted at their elbows on said arched rods, and links connected to said bell crank levers and to said boxes above the first named links and operating to move the inner ends of said shafts vertically.

2. A harrow including a frame, arched brace rods connected to said frame, yoke-like shaft hangers having posts mounted to turn in openings in the frame end bars, said posts having flanges bearing against said end bars, strap brackets on said end bars projecting over said flanges and retaining the same in position, bearing boxes pivotally mounted in the branches of said yoke like hangers, a pair of disk shafts mounted to turn in said boxes, disks on said shafts, sleeves engaging the inner free ends of said shafts, levers pivoted on said arched rods and loosely connected to said sleeves for moving the inner ends of said shafts horizontally, and bell crank levers pivoted on said rods and loosely connected to said sleeves for moving the inner ends of said shafts vertically.

In testimony whereof, we affix our signatures in presence of two witnesses.

CHARLES A. MONROE.
WILLIE E. ROBINSON.

Witnesses:
J. W. TREMPER,
FRANK AKINS.

Copies of this patent may be obtained for five cents each, by addressing the "Commissioner of Patents, Washington, D. C."